United States Patent [19]
Perlman et al.

[11] Patent Number: 5,978,381
[45] Date of Patent: Nov. 2, 1999

[54] TRANSMITTING HIGH BANDWIDTH NETWORK CONTENT ON A LOW BANDWIDTH COMMUNICATIONS CHANNEL DURING OFF PEAK HOURS

[75] Inventors: Stephen G. Perlman, Mountain View; William H. Yundt, Foster City; Stuart Schneck, Piedmont, all of Calif.

[73] Assignee: WebTV Networks, Inc., Mountain View, Calif.

[21] Appl. No.: 08/870,532

[22] Filed: Jun. 6, 1997

[51] Int. Cl.[6] ................................................. H04J 3/26
[52] U.S. Cl. .................. 370/432; 395/200.49; 395/20.57
[58] Field of Search ................................. 370/432, 229, 370/230, 232, 233, 234, 235, 468, 477; 348/7, 8, 10, 12; 395/200.48, 200.49, 200.59, 670–674, 406, 182.11, 200.47, 200.57, 200.58

[56] References Cited

U.S. PATENT DOCUMENTS

| | | | |
|---|---|---|---|
| 4,429,385 | 1/1984 | Cichelli et al. | 370/92 |
| 5,220,420 | 6/1993 | Hoarty et al. | 358/86 |
| 5,241,587 | 8/1993 | Horton et al. | 379/92 |
| 5,325,423 | 6/1994 | Lewis | 379/90 |
| 5,488,411 | 1/1996 | Lewis | 348/8 |
| 5,538,255 | 7/1996 | Barker | 463/41 |
| 5,558,339 | 9/1996 | Perlman | 463/42 |
| 5,564,001 | 10/1996 | Lewis | 395/154 |
| 5,586,257 | 12/1996 | Perlman | 463/42 |
| 5,612,730 | 3/1997 | Lewis | 348/8 |
| 5,612,897 | 3/1997 | Rege | 395/200.49 |
| 5,689,708 | 11/1997 | Regnier et al. | 395/200.59 |
| 5,737,747 | 4/1998 | Vishlitzky | 711/118 |
| 5,790,935 | 8/1998 | Payton | 348/7 |

FOREIGN PATENT DOCUMENTS

| | | |
|---|---|---|
| 3204259 | 5/1991 | Japan . |
| 4250591 | 7/1992 | Japan . |
| 6314184 | 8/1994 | Japan . |
| 2141907 | 1/1985 | United Kingdom . |
| WO 9309631 | 11/1991 | WIPO . |
| WO 9319427 | 3/1992 | WIPO . |

OTHER PUBLICATIONS

"A Hierarchical Internet Object Cache", Chankhunthod, et al., U.C. Southern California & U.C. Colorado, 6pp.

"Monitoring Corporate Information With FirstFloor Products", FirstFloor, pp. 1–9, 1996.

*Primary Examiner*—Douglas W. Olms
*Assistant Examiner*—Phirin Sam
*Attorney, Agent, or Firm*—Workman, Nydegger, Seeley

[57] ABSTRACT

The present invention describes a method for transmitting high bandwidth network content on a low bandwidth communications channel during off peak hours. According to one embodiment of the present invention, criteria is determined for downloading data from the communications channel and the data is downloaded from the communications channel during off-peak hours based on the determined criteria. According to another embodiment, a method for coordinated multicasts on a network is described. Download requests are received on a server from a plurality of clients on the network and stored on the server for the coordinated multicast. The coordinated multicast is generated at a predetermined time and then broadcast from the server to the plurality of clients at the predetermined time.

20 Claims, 10 Drawing Sheets

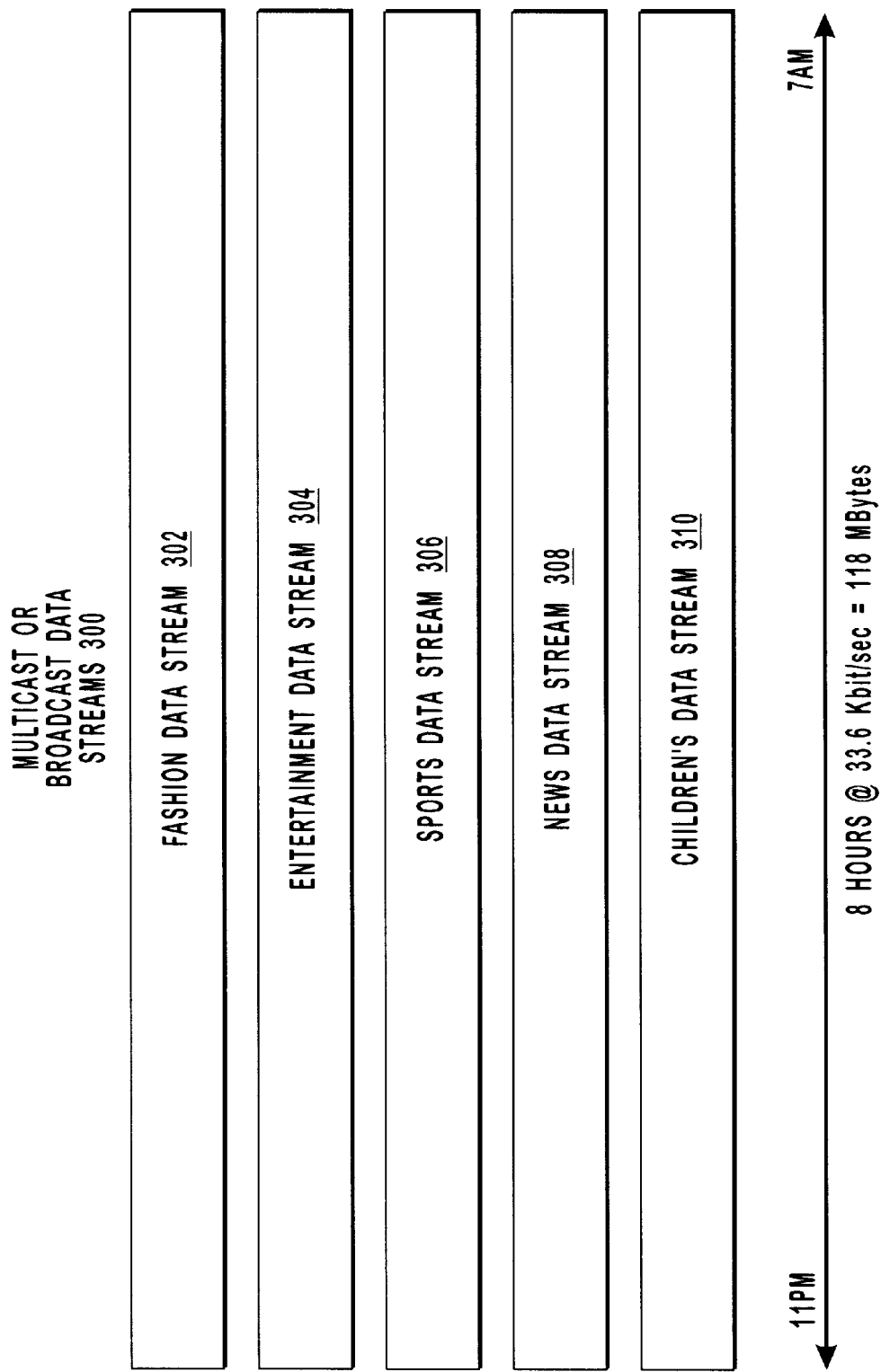

| MULTICAST OR BROADCAST DATA STREAMS | | | | | |
|---|---|---|---|---|---|
| FASHION | FASHION | FASHION | FASHION | FASHION | FASHION |
| SPORTS 1 | SPORTS 1 | SPORTS 1 | SPORTS 1 | SPORTS 1 | SPORTS 1 |
| SPORTS 2 | SPORTS 2 | SPORTS 2 | SPORTS 2 | SPORTS 2 | SPORTS 2 |
| NEWS | NEWS | NEWS | NEWS | NEWS | NEWS |
| ADVERTISING | ADVERTISING | ADVERTISING | ADVERTISING | ADVERTISING | ADVERTISING |

11PM ↔ 7AM

8 HOURS @ 33.6 Kbit/sec = 118 MBytes

FIG. 3B

TRANSMITTING HIGH BANDWIDTH NETWORK CONTENT ON A LOW BANDWIDTH COMMUNICATIONS CHANNEL DURING OFF PEAK HOURS

FIELD OF THE INVENTION

The present invention relates to the field of networked computer systems. Specifically, the present invention relates to a method and apparatus for transmitting high bandwidth network content on a low bandwidth communications channel during off peak hours.

DESCRIPTION OF RELATED ART

With the advent of consumer-oriented services on global networks such as the Internet, there has been an explosion of interest in delivering these services to users in their homes. Private on-line services such as America On-line (AOL™), Internet Service Providers (ISPs) such as Netcom™, and television-based Internet services such as the WebTV™ Network from WebTV Networks, Inc., are all seeking to provide on-line services to typical consumers in their homes.

Unfortunately, the world's residential communication infrastructure was not designed to accommodate the high-bandwidth, two-way requirements of on-line services. Consequently, usage in the home is, for the most part, limited to "plain old telephone service" or "POTS" modems and Integrated Services Digital Network (ISDN) services. Although modems are becoming increasingly more efficient in utilizing the bandwidth of a telephone voice channel, they are ultimately limited to the 64 Kbps digitization of voice channels in the switched telephone network. ISDN, in some countries, can provide approximately 128 Kbps in bandwidth. That is, however, the upper limit in bandwidth for two-way communications using today's available infrastructure to homes.

Although there are other experimental and proposed technologies to provide two-way high-bandwidth communications to the home beyond 128 Kbps, none of these technologies have been deployed to any significant degree on a nationwide or worldwide basis. For example, Asynchronous Digital Subscriber Loop (ADSL) uses the telephone twisted pair going to the home from the telephone central office to provide over 1 Mbps of downstream (to the home) bandwidth and lower upstream bandwidth. Cable modems, utilizing the Cable TV (CATV) infrastructure can provide over 10 Mbits of downstream bandwidth and over 1 Mbps of upstream bandwidth. Also, hybrid approaches have been proposed in which a POTS telephone modem provides a low-bandwidth upstream channel while a one-way cable modem, a Direct Broadcast Satellite (DBS) feed, or even a terrestrial broadcast provides the downstream channel at over 10 Mbits/sec, Each of these high-bandwidth technologies has significant infrastructure upgrade implications and/or significant scalability limitations. For example, ADSL requires the installation of ADSL modems in every telephone central office. Clearly, this amounts to a monumental undertaking. Cable, DBS, and terrestrial communications systems are broadcast architectures with limited overall bandwidth which is easily swamped when it is used for individual messages to potentially thousands, or even millions, of subscribers. Although a given cable plant can theoretically be segmented into independent subtrees to handle more individual messages, there are still monumental infrastructure upgrade implications.

Thus, given the bandwidth limitations of current communications infrastructure to the home, and given the high cost, monumental upgrade implications, and limitations of proposed new infrastructure, better methods are needed to bring high-bandwidth content services into the home using existing infrastructure.

SUMMARY OF THE INVENTION

The present invention describes a method for transmitting high bandwidth network content on a low bandwidth communications channel during off peak hours. According to one embodiment of the present invention, criteria is determined for downloading data from the communications channel and the data is downloaded from the communications channel during off-peak hours based on the determined criteria.

According to another embodiment, a method for coordinated multicasts on a network is described. Download requests are received on a server from a plurality of clients on the network and stored on the server for the coordinated multicast. The coordinated multicast is generated at a predetermined time and then broadcast from the server to the plurality of clients at the predetermined time.

Other objects, features and advantages of the present invention will be apparent from the accompanying drawings and from the detailed description.

BRIEF DESCRIPTION OF THE DRAWINGS

The present invention is illustrated by way of example and not by way of limitation in the figures of the accompanying drawings in which like reference numerals refer to similar elements and in which:

FIGS. 3A–3D illustrate multicast or broadcast data streams according to various embodiments of the present invention

DETAILED DESCRIPTION OF THE PREFERRED EMBODIMENT

The present invention is a method and apparatus for transmitting high bandwidth network content on a two-way low bandwidth communications channel during off peak hours. One embodiment of the present invention utilizes typical on-line services and Internet usage patterns as well usage patterns of existing communications channels to provide the user of a low bandwidth communications channel with an experience similar to the experience enjoyed by users utilizing a high-bandwidth communication channel. In the following detailed description, numerous specific details are set forth in order to provide a thorough understanding of the present invention. It will be apparent to one of ordinary skill in the art that these specific details need not be used to practice the present invention. In other instances, well-known structures, interfaces, and processes have not been shown in detail in order not to unnecessarily obscure the present invention.

Figure 1A:
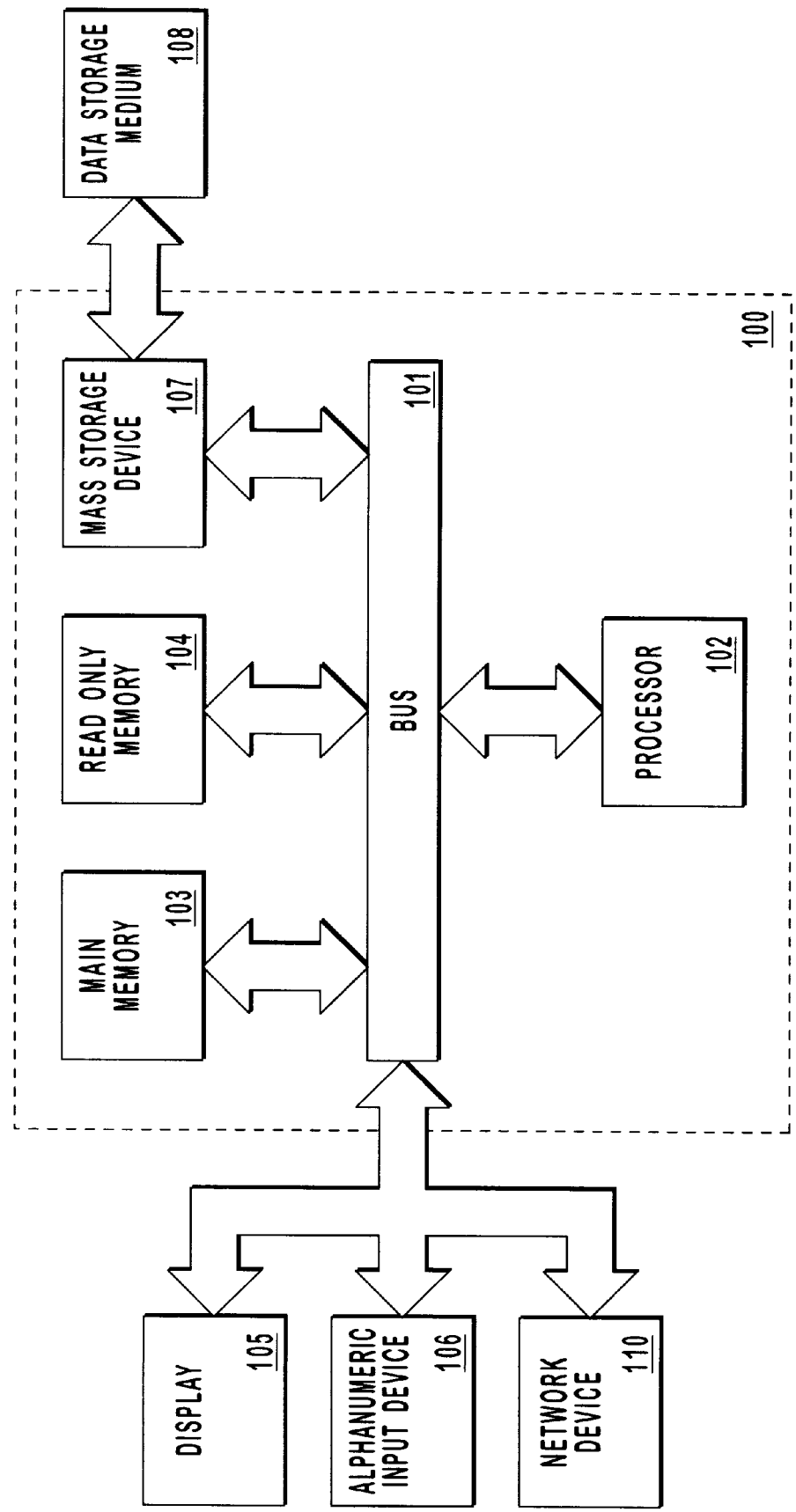
FIG. 1A is a typical computer system in which the present invention operates.

FIG. 1A illustrates a typical computer system 100 in which the present invention operates. One embodiment of the present invention is implemented on a personal computer architecture. It will be apparent to those of ordinary skill in the art that other alternative computer system architectures may also be employed.

In general, such computer systems as illustrated by FIG. 1A comprise a bus 101 for communicating information, a processor 102 coupled with the bus 101 for processing information, main memory 103 coupled with the bus 101 for storing information and instructions for the processor 102, a read-only memory 104 coupled with the bus 101 for storing static information and instructions for the processor 102, a display device 105 coupled with the bus 101 for displaying information for a computer user, an input device 106 coupled with the bus 101 for communicating information and command selections to the processor 102, and a mass storage device 107, such as a magnetic disk and associated disk drive, coupled with the bus 101 for storing information and instructions. A data storage medium 108 containing digital information is configured to operate with mass storage device 107 to allow processor 102 access to the digital information on data storage medium 108 via bus 101.

Processor 102 may be any of a wide variety of general purpose processors or microprocessors such as the Pentium® microprocessor manufactured by Intel® Corporation. It will be apparent to those of ordinary skill in the art, however, that other varieties of processors may also be used in a particular computer system. Display device 105 may be a liquid crystal device, cathode ray tube (CRT), or other suitable display device. Mass storage device 107 may be a conventional hard disk drive, floppy disk drive, CD-ROM drive, or other magnetic or optical data storage device for reading and writing information stored on a hard disk, a floppy disk, a CD-ROM a magnetic tape, or other magnetic or optical data storage medium. Data storage medium 108 may be a hard disk, a floppy disk, a CD-ROM, a magnetic tape, or other magnetic or optical data storage medium.

In general, processor 102 retrieves processing instructions and data from a data storage medium 108 using mass storage device 107 and downloads this information into random access memory 103 for execution. Processor 102, then executes an instruction stream from random access memory 103 or read-only memory 104. Command selections and information input at input device 106 are used to direct the flow of instructions executed by processor 102. Equivalent input device 106 may also be a pointing device such as a conventional mouse or trackball device. The results of this processing execution are then displayed on display device 105.

Computer system 100 includes a network device 110 for connecting computer system 100 to a network. Network device 110 for connecting computer system 100 to the network includes Ethernet devices, phone jacks and satellite links. It will be apparent to one of ordinary skill in the art that other network devices may also be utilized.

Another embodiment of the present invention is implemented on a system known as WebTV, by WebTV Networks, Inc., Palo Alto. The WebTV system uses a standard television set as a display device for browsing the Web and connects to a conventional network, such as the Internet, using standard telephone, Integrated Services Digital Network (ISDN), or similar communication lines. A user of a WebTV client system can utilize WebTV network services provided by one or more remote WebTV servers. The WebTV network services can be used in conjunction with software running in a WebTV client system to browse the Web, send electronic mail, and to make use of the Internet in various other ways. The WebTV network uses a HyperText Transport Protocol (HTTP) based set of protocols implemented within the Web and supported by one or more Web servers.

Figure 1B:
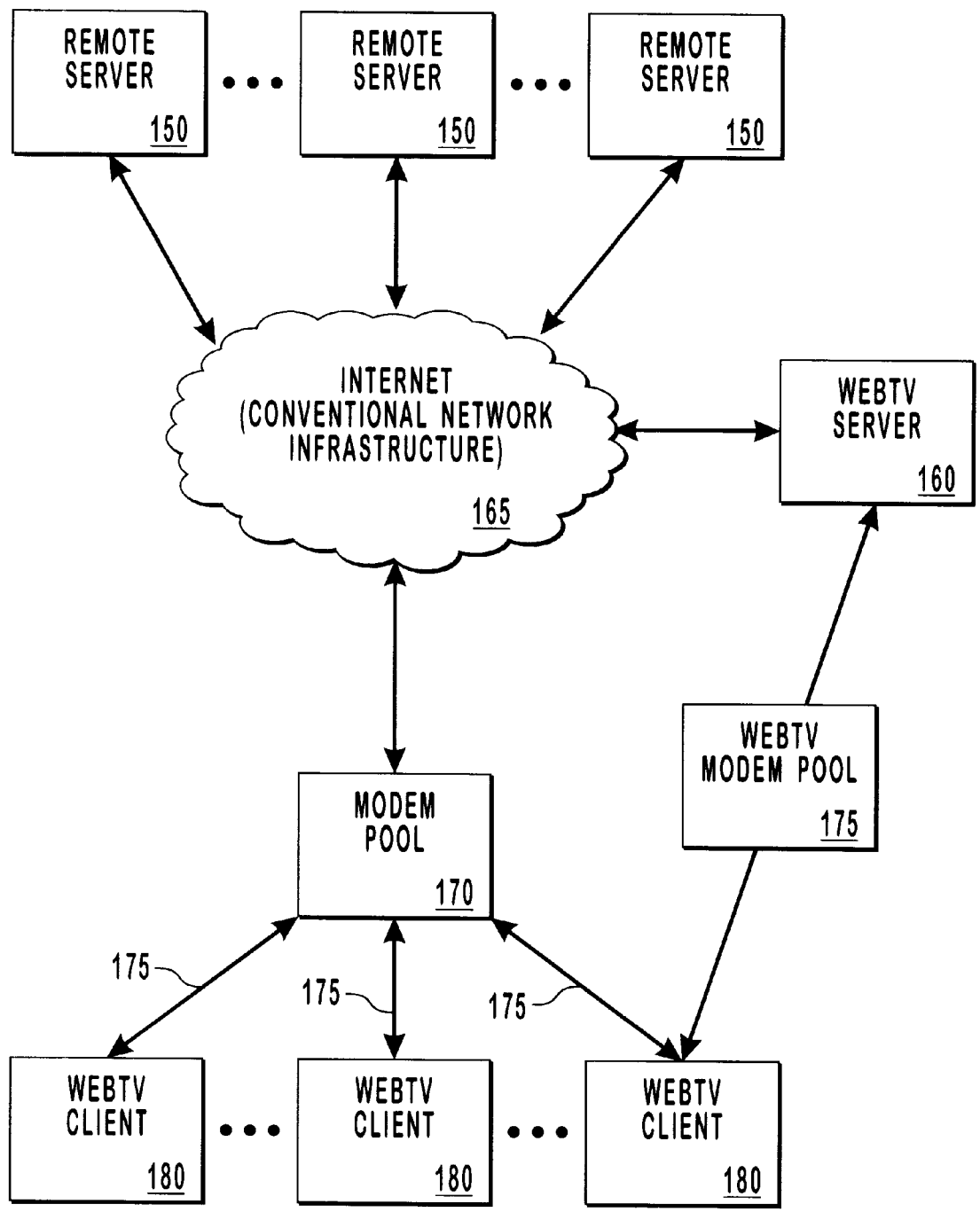
FIG. 1B is an alternate computer system (a WebTV system) in which the present invention operates.

FIG. 1B illustrates a basic configuration of the WebTV network according to one embodiment. A number of WebTV clients 180 are coupled to a modem pool 170 via direct-dial, bi-directional data connections 175, which may be telephone (POTS, i.e., "plain old telephone service"), ISDN (Integrated Services Digital Network), or any other similar type of connection. Modem pool 170 is coupled typically through a router, such as that conventionally known in the art, to a number of remote servers 150 via a conventional network infrastructure 165, such as the Internet.

The WebTV system also includes a WebTV server 160, which specifically supports the WebTV clients 180. WebTV server 160 acts as a proxy in providing the WebTV client 180 with access to the Web and other WebTV services. More specifically, WebTV server 160 functions as a "caching proxy." A proxy cache on WebTV server 160 is used for temporary storage of Web documents, images, and other information which is used by frequently either the WebTV client 180 or the WebTV server 160.

WebTV clients 180 each have a connection to the WebTV server 160 either directly, via a WebTV modem pool 175, similar to modem pool 170, or through the conventional modem pool 170 and the Internet 165. Note that the modem pool 170 is a conventional modem pool, such as those found today throughout the world providing access to the Internet and private networks. Further details of the WebTV system, including the WebTV client can be found in co-pending U.S. Patent application entitled, "Web Browser Allowing Navigation Between Hypertext Objects Using Remote Control," having application no. 08/660,088, and filed on Jun. 3, 1996.

One embodiment of the present invention is implemented as a software module, which may be executed on a computer system such as computer system 100 or WebTV server 160 in a conventional manner. Using well known techniques, the application software of the preferred embodiment is stored on data storage medium 108 and subsequently loaded into and executed within computer system 100 or WebTV server 160. Once initiated, the software of this embodiment operates in the manner described below.

Figure 2A:
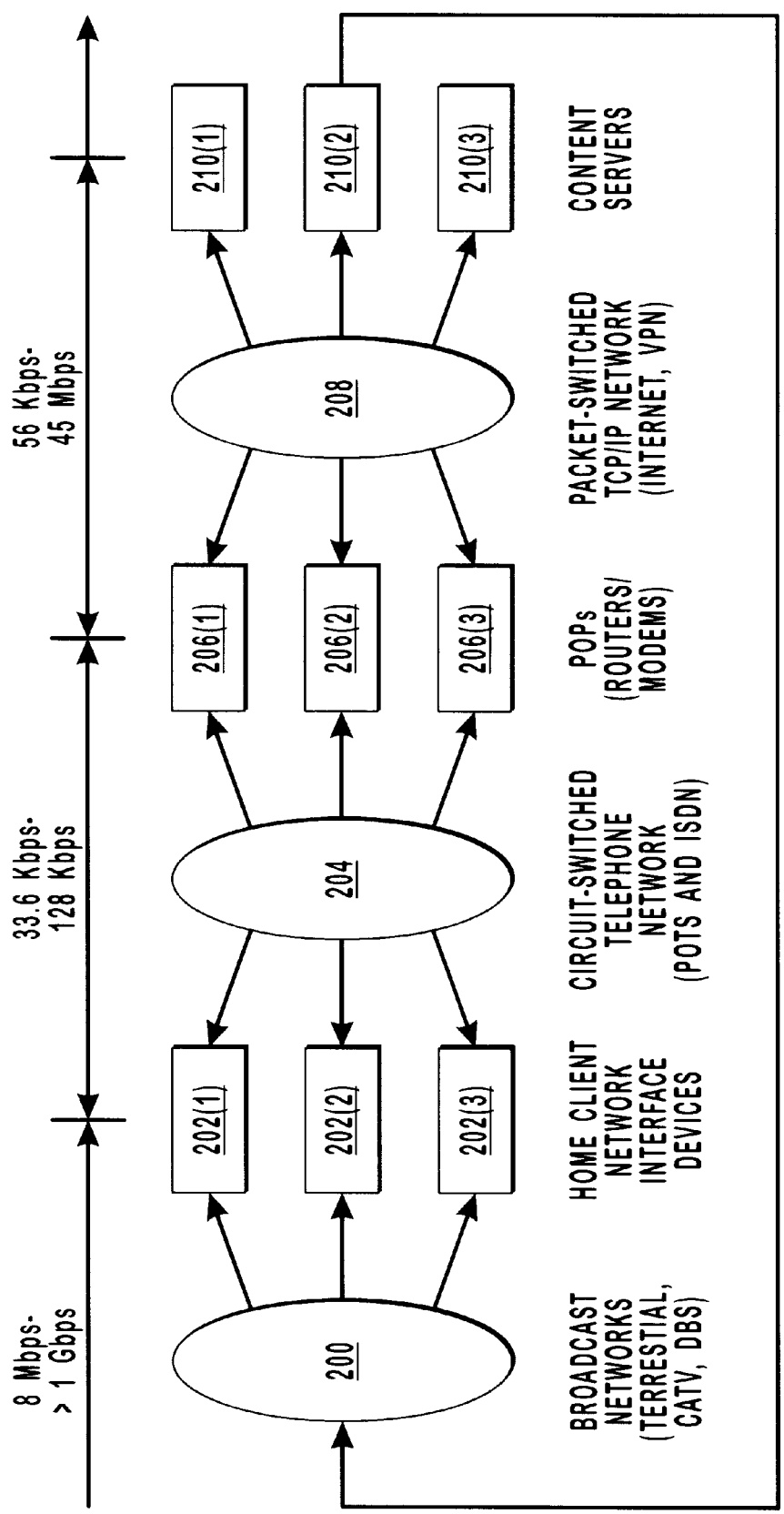
FIGS. 2A and 2B illustrate the currently available devices and services on the Internet today

FIG. 2A illustrates the variety of communications channels currently available to the typical home on-line service subscriber in an industrialized country such as the United States, Japan, or the United Kingdom. The arrows indicate the direction(s) of data flow over a given channel.

A user browsing the Internet today can select specific content such as web pages, video clips, audio clips or advertisements. This selected content is typically stored on servers on the Internet, identified in FIG. 2A as content server 210. Since these content servers are usually maintained at commercial locations, very high bandwidth communications channels such a T1 or T3 lines are available to connect them to either a TCP/IP network, such as the Internet or a Virtual Private Network (VPN), or other packet-switched networks, such as X.25. Content servers may also be connected to conventional broadcast channels 200 including a CATV channel, a terrestrial channel, or a DBS channel. Because of the nature of these conventional broadcast channels 200, however, they are typically limited to transmitting data in a single downstream direction, namely from the content server to the client.

Such content servers can be located at one site or at many sites throughout the world. In fact, it is quite possible to replicate such content servers in several locations so as to minimize the communications channel resources used by bringing a content server closer to each subscriber and to provide redundancy in the event of a server or communications failure.

Figure 2B:
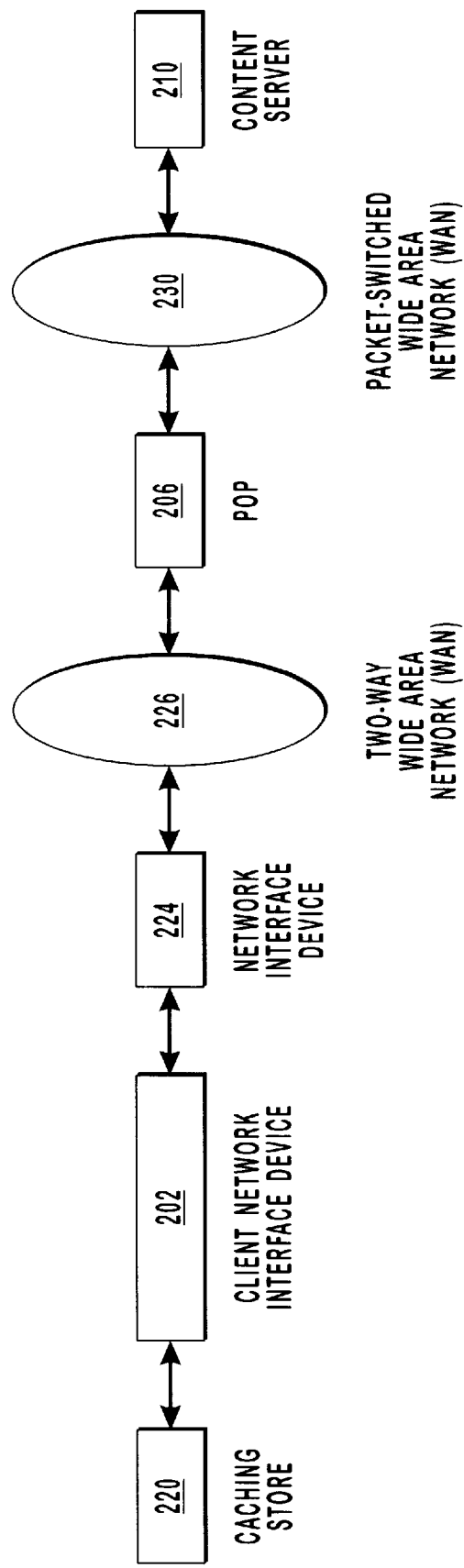

FIG. 2B illustrates a common configuration today for personal computer (PC) and network-enabled set-top boxes and video game consoles. Client network interface device (client device) 302 may include a device such as a WebTV™ set-top box, a video game system or a PC, that incorporates features described in computer system 100 above. Connected to client device 202 is a network interface device 224, such as a POTS modem, an ISDN adapter, a cable modem or an ADSL modem. Also connected to client device 202 is caching store 220. Caching store 220 may include a hard disk, a digital video disk (DVD), flash Read-Only Memory (ROM), or Random Access Memory (RAM). Other client devices, network interface devices and caching stores may also be utilized.

Network interface device 224 connects to a two-way wide-area network (WAN) 226. According to one embodiment of the present invention, two-way WAN 226 is a switched telephone network (POTS or ISDN). ADSL, two-way cable plant, or other two-way network technology may also be utilized. Given the current infrastructure that is widely available for homes throughout the world, a POP is necessary to connect the home to the packet-switched WAN. Thus, as illustrated in FIG. 2B, POP 206 connects the two-way WAN to a packet-switched WAN 230 such as a TCP/IP network (e.g. the Internet or a VPN) or an X.25 network. In the event that a packet-switched WAN 230 can be delivered directly to the home in the future, POP 206 will no longer be necessary. Finally, within reach of the packet-switched wide area network is at least one content server 210 containing content potentially of interest to the user of client device 202.

Typically, the user of client device 202 decides that he or she is interested in certain content available on one or more content servers 210. The user connects his or her client device 202 to a WAN such as the Internet or a private on-line service such as AOL™. This is generally accomplished by client software executing on client device 202 dialing the phone number of POP 206, going through an authentication procedure to establish the validity of the user's on-line account, and then providing the user with an on-line navigation means. The on-line navigation means may be through a general-purpose Hyper-Text Markup Language (HTML) browser, such Netscape Navigator™ or Microsoft™ Internet Explorer, or through a proprietary on-line browser such as the AOL client software.

If the user is seeking a particular content item, there are various tools such a search engines and catalogs that the user can use to search for the content. Once that item is found, the user typically clicks the mouse on a hyperlink to that item. The hyperlink in turn directs the client software to initiate a download into their client device 202. Depending on the data size of the content selected, the communications bandwidth, the network traffic, and the load on content server 210 holding the content, the download time may vary. The download may complete almost instantly or take minutes or hours. Upon completion of the download, the user may experience a visual result such as a picture or a video clip, or an auditory result such as music. Alternatively, the download may simply be a file that is stored in memory or on a disk for later use.

Although a download theoretically may complete very quickly, the typical experience of the home Internet or on-line service user is that downloads are very slow, even for relatively small data items. There are a number of factors that can make the download very slow, but even if all of the stages of the download are working at optimum efficiency, the home user is typically still limited to the bandwidth limitations of the switched telephone network.

ISPs such as AT&T WorldNet™ and WebTV Networks, Inc. offer flat-rate Internet access. While such flat rates are offered on the expectation of a certain average utilization of POP and network resources by the overall subscriber base, the ISP's primary concern is utilization during peak usage hours (Monday–Friday, 9 am–5 pm for business usage, evenings and weekend daytime for home usage). This is due to the fact that an ISP has a certain number of modems available in its POPs and a certain amount of bandwidth between its POPs and its servers to the Internet. The ISP must ensure that it has a sufficient number of modems and adequate bandwidth for peak usage. Otherwise, users will get busy signals or poor performance when they dial in for service during peak times. Thus, for an ISP to provide good service to its customer base, it must provide enough POP modems and enough bandwidth for peak usage.

Notably, an ISP's modem and bandwidth resources (collectively "ISP infrastructure") are largely idle during off-peak hours. Which hours of the day qualify as "off-peak hours" vary depending on a given ISP's customer base. In both the case of business and home customer base, however, traffic is typically light during late night and early mornings, 7 days a week in each time zone. During these hours, an ISP is amortizing equipment and paying for communications bandwidth on leased lines without utilizing the equipment. Thus, theoretically, if a large percentage of an ISP's user base were to connect to the ISP during these hours, it would have little or no impact on the ISP's costs of providing Internet access, so long as the number of users was less than its peak number of users, even though it would drastically increase the average number of on-line hours per month per user.

Following this supposition further, the telephone costs to the user for connecting during these off-peak hours would be zero or quite low, assuming the dialed POP was in a given user's local calling area. As described above, in the United States, residential local calls are generally charged at a flat-rate per month, regardless of duration. In other countries, local calls during off-peak hours are often cheaper than during peak hours. For example, in Japan, while local calls during peak hours are charged by the minute, a flat-rate service plan is available between the hours of 11 PM and 7 AM. Like the ISPs, phone companies must provide equipment and bandwidth to accommodate peak loads. During off-peak hours, this equipment and bandwidth sits idle, so the company may desire to incent users to utilize the equipment during these hours.

According to one embodiment of the present invention, the methods of on-line communications using the configuration shown in FIG. 1B are improved significantly. The improvements take advantage of the fact that, as described above, typically in the home, a client device is utilized only during certain hours of the day. The presently claimed invention leverages the usage patterns to provide many of the characteristics of high-bandwidth two-way communications by heavily utilizing infrastructure during off-peak times.

In one embodiment of the present invention, the client software allows the user to specify content that the user desires to access. For example, if the user is interested in news, the user might identify CNN™ Interactive, a web site that contains news items, as a web site of interest. During off-peak hours (when the user is probably asleep) the client software on client device 202 will direct client device 202 and network interface device 124 to automatically dial into to a local POP 132, provide appropriate authentication, and then download all of the content the user has specified to be of interest. In the case of the CNN Interactive web site, the client software may explore all of the links originating from the root home page (i.e. http://www.cnn.com/) to some level of depth (e.g. to all pages within the cnn.com domain). As each web page comes in, its content will be stored in caching store 220.

Some of the links may very well contain large quantities of data, such as compressed video, which using currently known techniques, is only convenient to download through a high bandwidth connection. Alternatively, according to this embodiment of the present invention, the client software will have several off-peak hours to complete the downloads and will thus be able to download these large data items over a standard lowbandwidth communications mechanism. For example, at 33.6 Kbps, 118 MBytes of data can be downloaded in 8 hours. 1 minute of MPEG 1 video is about 10 MBytes of data. Currently, a user with a 33.6 Kbps modem would wait almost an hour to download 1 minute of video. According to this embodiment, however, the user may specify this type of content to be downloaded overnight. The next day, the video may be viewed in real-time from caching store 220.

The mechanism described above has significant advantages over currently available techniques. According to other embodiments of the present invention described below, further refinements provide for a better experience to the user and better resource utilization for the ISP.

A. Blind Downloads

One potential problem with the off-peak download mechanism just described is that if the client software blindly downloads content specified by the user, it may very well be downloading some of the same content redundantly every night. For example, the user may be interested in the CNN Interactive web site, but not all of the content on the CNN Interactive web site changes every night. Some of the graphical elements such as banners or user interface elements may remain unchanged for weeks or months at a time. Additionally, there are references to previous days' stories that may have been downloaded over the previous few days.

Thus, according to an embodiment of the present invention, data is selectively download into the Caching Store. There are numerous well-known techniques for determining whether on-line data has been previously cached, as well as certain proprietary techniques described in the co-pending application entitled "Method and Apparatus For Providing Proxying and Transcoding Of Documents In A Distributed Network," having Ser. No. 08/656,924, filed Jun. 3, 1996. If only new data is downloaded each night, then over several successive nights, a working set of current data may be captured which is much larger than the 118 MBytes that can be downloaded in a single 8 hour session at 33.6 Kbps.

B. Tracking Downloads

Another problem with the off-peak download mechanism and improvements just described is that it requires a proactive effort on the part of the user to specify which content the user is interested in. According to an embodiment of the present invention, the client software tracks the on-line usage of the user and logs a list of the sites the user visits. During the off-peak download, the client software can download updates to those sites, on the assumption that the user may be interested in going back to those sites at a later date.

C. Selecting Sites for Download

According to yet another embodiment of the present invention, the client software may consult with a database stored on a content server which categorizes sites by subject area, find sites that fall into the same general category as sites visited by the user, and download those sites during the off-peak downloads on the assumption that the user may be interested in similar category sites. For example, if the user is interested in NFL™ football and frequently visits www.nfl.com, the user may also be interested in the general sports information available at the ESPN™ website (www.espn.com). This embodiment may also include explicit selections provided by the user.

D. Organizing Download Material

According to another embodiment of the present invention, the ISP provides a service that organizes material chosen by an editorial staff (human or electronic) to download to the user based on any of the following criteria: (a) interests explicitly specified by the user (b) tracking which sites the user visits and extrapolating the user's interests (c) judgments made by the editorial staff of sites considered to be novelties or of general interest (d) payments made by third parties publishers of "high-end" web sites for data from their sites to be downloaded and cached permanently (e) payments made by third parties for advertisements to be downloaded and inserted during the user's browsing experience. It will be apparent to one of ordinary skill in the art that other download criteria may also be employed.

This embodiment includes client and server side software. The client software connects to the ISP server software prior to starting its off-peak content download. The client software uploads relevant information to the server, such as explicitly specified interests of the user and user tracking information. The server software downloads to the client software a list of addresses of content to be downloaded during the off-peak download, based on the criteria described above. The caching store 220 can thus be customized to store content explicitly or implicitly in the user's interest.

E. Downloading Advertising

The caching store 220 can also store promotional content such as advertisements or particular web sites which third parties are willing to pay the ISP for the right to download and make available to the user. Presumably, such payments will reduce the ISPs operating costs and the savings can be passed along to the user in the form of reduced on-line costs. In this sense, such promotional content would serve a similar purpose to advertising on television: it would make content available to the user for a reduced cost, or for free.

According to one embodiment of the present invention, downloaded advertising is presented to the user in many forms. For example, the advertising can be placed as a "banner" on the screen amidst other content, or it could interrupt the user's browsing and be displayed periodically, just as TV ads interrupt the user's TV watching. The advertising can also be displayed while the user is visiting "free" sites, but suppressed while the user is visiting "premium" sites, namely sites that the user pays a monthly fee to view. Additionally, such advertising can be suppressed if the user pays a higher fee to the ISP.

Thus, according to this embodiment, advertising can be targeted more specifically to the user's interests using criteria similar to that used for selecting content to be downloaded to the user. Thus, unlike broadcast television where users must endure advertising directed to a fairly general audience, an embodiment of the present invention allows for improved, less intrusive, better targeted or non-existent (if the user is willing to pay a higher subscription fee) advertising.

Current Internet advertising generally connects the advertisement with a particular web page, usually in the form of a banner. If web pages containing such banners are cached in a caching store 220, several problems may arise. For example, each time the user returns to the cached web page, the same banner will be displayed. This is a disadvantage over current methods of displaying banners where banner ads change each time a web page is displayed. Additionally, if a web page is cached and the user never goes to it, any banner advertisement stored together with the web page is wasting cache space and download time.

Thus, according to one embodiment of the present invention, advertisements are stored separately from web pages and are inserted periodically during the user's browsing (regardless of what web page the user goes to). This embodiment thus allows the advertisements to change throughout the browsing experience, while optimizing the cache space and download time. This embodiment also allows the advertisements to be better targeted to the user's interests because the ads are targeted based on all of the data known about the user, not simply the fact the user is viewing a given web page. Finally, this embodiment makes it possible for the user to suppress advertising altogether by paying a higher fee to the ISP.

F. Downloading Updates

According to one embodiment, a variety of data may be transmitted during off-peak hours. For example, users may be allowed to schedule software updates during these hours. While a user is logged in during the day, the user may be presented with the option of upgrading various software on his or her client machine. If the user selects the upgrade, the user may then be presented with the option of having the upgrade downloaded during off-peak hours, thus reducing the amount of time that the user is logged on to the network during peak hours. This is especially advantageous for large downloads that may require prolonged connectivity. It will be appreciated by one of ordinary skill in the art that other types of data may also be downloaded during these off-peak hours.

G. Purchasing Bandwidth and Caching Store Space

According to another embodiment of the present invention, web site publishers can "purchase" bandwidth and caching store 220 space. These web sites can thus ensure that data from their sites is always available to the user. This embodiment allows high-end content providers, such as Disney™ or ESPN, to present a richer experience with their web sites than would otherwise be possible. For example, instead of a user seeing still images and text when they go to the www.disney.com home page (since the Disney web site designers were limited to an amount of data that can download in a few seconds with a 33.6 Kbps modem), the user could be greeted with full-motion video and sound upon reaching the web site. Anything that requires a large download during the night could not be completely up-to-date, but text or other low-bandwidth data elements could download at the 33.6 Kbps rate when the user goes to the site to be overlaid upon the previously cached high-bandwidth data. Thus, visually rich "stock footage" from the caching store 220 can be combined with completely current data downloaded at the time the site is visited to provide a compelling and up-to-date experience for the user.

H. Coordinated Multicast Downloads

Although the previously described embodiments work well for an individual client device 202, there are scalability issues that crop up when there are hundreds of thousands or millions of client devices 202. Although each individual client device 202 would typically require a relatively low-bandwidth data stream (e.g. 33.6 Kbps), one million client devices 202 being simultaneously updated would have an aggregate bandwidth requirement of 33.6 Gigabits/sec. If a significant number of these client devices 202 are attempting to download data from a single content server 210 at once, the server would be overwhelmed and many of client devices 202 would have to wait until the server is available. Additionally, if many of client devices 202 are utilizing any common communications channel simultaneously (e.g. a T1 line leading into a single POP serving many client devices 202), that channel can also become overwhelmed resulting in communications delays. The amount of data that can be downloaded overnight is directly proportional to the percentage of time client device 202 communications channel is active. Thus it is clearly desirable to avoid overloading content servers and shared communications channels so as to minimize client device 202 wait time and maximize the amount of data downloaded.

One embodiment of the present invention coordinates downloads through one or more content servers on the network, utilizing a "multicast" transmission protocols, rather than having data downloads initiated by each client device 202 independently. Some particular multicast protocols are well known in the art and are generally intended to provide live broadcasts of data through a network (e.g. a TCP/IP network such as the Internet), typically for the purpose of disseminating media format data such as sound or video in real-time. For example, multicast protocols can be used to transmit compressed audio or video from a baseball game in progress. Whereas typical TCP/IP communications are one-to-one, multicast communications are one-to-many. Multicast protocols on the Internet allow a bandwidth "slot" to be reserved in advance for the multicast on all the routers carrying the multicast data. Thus, the server generating the multicast can be certain that any client desiring to receive the multicast will be able to do so without a break in the communications, despite adverse traffic conditions on the Internet.

One embodiment of the present invention uses TCP/IP multicast protocols to disseminate data as follows. At a pre-established time, all client devices 202 desiring to be updated connect to the Internet. Each client device connects to a server at a pre-established IP address and downloads information as to what data feeds are available, when they are available, the nature of the data, and the multicast addresses where the data can be accessed. Based on the particular profile(s) of the user(s) of a given client device 202 and an assessment of which data has already been downloaded to client device 202 during previous sessions, client device 202 software makes a determination of which data feeds are most relevant for the user and contain new data which has not previously been downloaded. Then, at the appointed times client device 202 begins to the receive the appropriate data streams.

Figure 3C:

The data streams used by the presently preferred embodiment can come in several forms, as illustrated in FIGS. 3A–3D. A simple organization is shown in FIG. 3A. Five data streams are shown in this figure (data streams 302–310), each containing data focused on a particular area of interest. The data streams are each 8 hours of a steady download at a given data rate, in this example, 33.6 Kbits/sec. If the five data streams shown here were available on a given night and the user of a client device 202 were interested in Sports data stream 306, client device 202 could then connect to the Sports multicast data stream 306 at 11 PM, and commence downloading into its caching store 220. By 7 AM, if there were no disruptions, client device 202 would have downloaded approximately 118 MBytes of Sports-orient content, which might include video and audio clips, images, text and interactive content. The user would be able to enjoy this Sports content during the day and would benefit from near instant access since the data would be stored on its caching store 220. Of course, if client device 202's user were more interested in News, or Children's content, then the Client could download the News multicast data stream 308 or Children's multicast data stream 310 instead.

Clearly, there could be millions of client devices 202 simultaneously downloading data from multicast data streams, while imposing little burden on either the content server 210 supplying the data streams or Internet communications infrastructure carrying the multicast. The five data streams together constitute only 33.6 Kbits/sec*5=168 Kbits/sec of data bandwidth, a minor burden on either content server 210, or a T1 or a T3 line, especially during off-peak hours. Thus, compared to a million client devices 202 simultaneously requesting individual 33.6 Kbit/sec data streams (resulting in 33.6 Gigabits/sec of aggregate bandwidth), this embodiment results in a much lower aggregate bandwidth.

I. Retransmissions

One limitation to the approach described above is that the communications infrastructure through the Internet and through telephone dial-up connections is imperfect. Packets are dropped, routers have throughput problems, phone connections are dropped, etc. Additionally, the user may choose to use client device 202 during some portion of the designated download hours. Thus, client device 202 may not be available for downloading if it is being used for another purpose. Further, since a residential telephone line is often used for more than one use, the telephone line may be engaged during a portion of the download hours, blocking client device 202 from using it.

Thus, it is essential that the data streams are structured appropriately to allow for the fact that some client device 202s may not receive a perfect uninterrupted data stream. There are a number of approaches that can be applied to this problem. As shown in FIG. 3B, data can be transmitted repeatedly, staggered by some period of time. The same Sports information could be transmitted every hour, as shown in the Sports 1 data stream. If a Client device 202 whose user is interested in Sports receives a bad packet or is disrupted during a download of Sports 1, it simply can wait for hour later to receive the same data again. It will be appreciated by one of ordinary skill in the art that the retransmitted data may be staggered by any appropriate period of time (i.e. greater or less than one hour).

Repeating Sports 1 data reduces the amount of Sports data that can be transmitted over the eight hour period. If Sports was an important enough category, however, one or more additional data streams could be allocated to Sports information. In this example, as illustrated in FIG. 3B, two data streams are allocated to Sports, Sports 1 and Sports 2, each repeating every hour. The repeating data gives ample opportunity for a Client device 202 to download data in subsequent hours if there are any transmission errors (corrupt or missed data packets). Unless there are extremely unreliable communications or if client device 202 or the phone line is tied up for many hours during the download period, client device 202 should have no trouble downloading an hour of Sports 1 and an hour of Sports 2 during the eight hour period.

Some users may be interested in more than one subject area. In this case client device 202 could utilize the repeating data streams shown in FIG. 3B to receive a selection of several content areas. For example, if the user were interested in Fashion, Sports and News, the Client device 202 may download one hour from each data stream for four hours. Also, for one hour, client device 202 may download Advertising (which could be used to help pay for the cost of the other content). In the remaining hours client device 202 may download any data packets that were corrupted or missed in the preceding hours.

This embodiment of the present invention is distinct from current advertising on the Internet, where the advertising is downloaded from a web site, typically in the form of a "banner" associated with a particular Web page. In the current embodiment, advertising can be downloaded as a separate data stream into client device 202. When the user uses client device 202 to view web sites, client device 202 can overlay advertising over any web page, or display advertising between web pages, or while web pages are loading, if, for example, they are not stored in the caching store 220. In this way, an advertiser can be certain its ad is viewed by a user, regardless of which web sites they decide to visit. There is also no bandwidth wasted downloading advertisements tied to particular content that may never be viewed.

Another embodiment of the present invention provides more efficient correction of sporadic transmission errors. Given that Internet communications and high-speed modem communications are for the most part reliable, there should be a relatively small number of data errors during the download of multicast data, and these errors will tend to be sporadic. Consequently, it would not be efficient for client device 202 to sacrifice an entire hour of download time just so it can wait for the retransmission of a packet that was corrupted in the previous hour of a data stream. Moreover, it may be the case that the packet downloads with the same error again, or that there are packet errors in more than one data stream which occur at the same moment during an hour, and therefore cannot both be received at once if only one hour is allocated to correct all errors.

Several improvements in this embodiment alleviate these problems. For one, the repetition interval of the data streams can be made to be smaller with more data streams allocated. This gives more opportunity to correct errors, but it has the disadvantage of using more bandwidth. An alternative improvement is to allocate a block of time for client devices 202 to make individual retries of a conventional nature as shown in FIG. 3C. For example, if a client device 202 downloads data from all five data streams and there were a total of 10 data errors over the course of the downloads, client device 202 may request the content server 210 supplying the data streams to send the particular 10 packets that were dropped in the multicast. If one million client devices 202 receiving multicast data streams all suffer from 10 data errors, there will be 10 million retry requests to content server 210. Although this is a large number of requests, the requests do no necessarily need to be answered instantly, and client devices 202 can wait until it is their turn to have their requests filled.

Figure 3D:
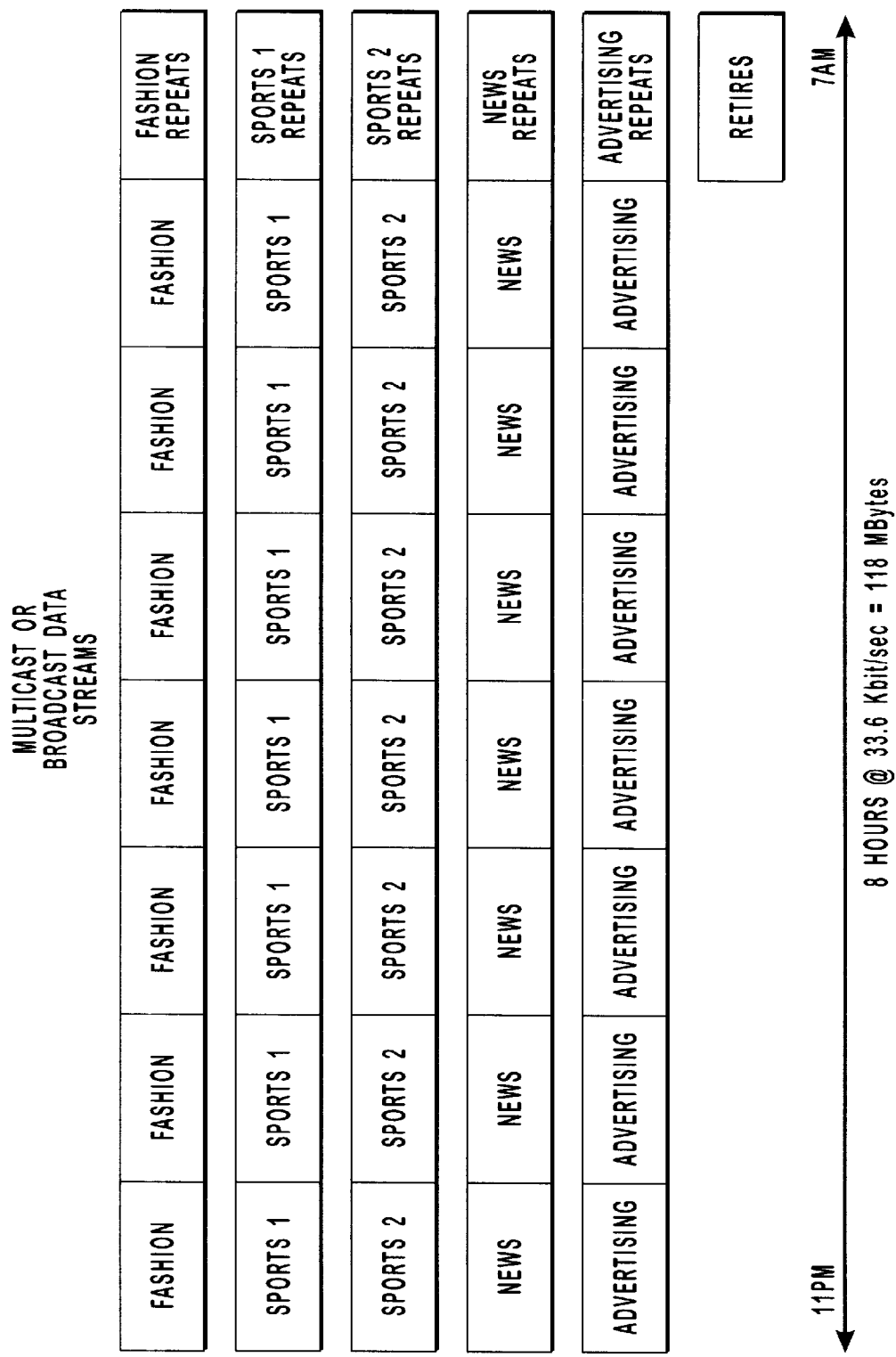

Yet another improvement is shown in FIG. 3D. As previously described, a block of time is allocated for client devices 202 to make retry requests to content server 210 supplying the data stream. But, rather than responding directly to the requesting client device 202, content server 210 transmits the repeated data on the appropriate multicast data stream. In this way other client devices 202 that experienced the same error will be able to receive the corrected data. This is more efficient than sending individual responses because it is often the case that the same data packet error may affect several recipients of a multicast (e.g. if several client devices 202 are downstream from the same network node that causes the data packet error).

J. Conditional Viewing Restrictions

Certain content that is downloaded using the mechanisms just described may be intended for viewing only by a user paying a special fee. According to one embodiment, client device 202 downloads such so-called for-pay content, but does not allow the user to view the data unless certain conditions are met such as, for example, the transferring of funds to the account of the owner of the for-pay content. Another condition permitting the viewing of the for-pay content might be a trial offer whereby the user may preview part of the for-pay content, but must pay for viewing the rest of the for-pay content.

K. Call Waiting Interrupt

One problem with client device 202 doing an eight-hour download of data through a residential telephone line is that, although the download might occur during times when the user is sleeping, another party might want to reach the user in an emergency. Most United States telephone lines are equipped with a Custom Calling feature known as Call Waiting which introduces a "bong" sound to a telephone call when a third party is calling. By "flashing" the switchhook, the telephone call can be put on hold and the third party will be connected. This Call Waiting capability can be used to allow an incoming call to interrupt a long data download as described in copending patent application entitled "Method and Apparatus For Managing Communications Between A Client And A Server In A Network," having Ser. No. 08/660,087, filed Jun. 3, 1996. The lost data packet recovery mechanisms described previously can be used to recover packets lost during such Call Waiting disruptions.

L. Off-peak Downloads

Although the data download mechanisms described above provide a means to download a great deal of data during off-peak times, a characteristic of this approach is that the data downloaded is not completely up-to-date when the user views it. For example, a news clip that is downloaded at 2 AM and viewed at 6 PM may not be as interesting to the viewer as something more current. A further improvement to the presently preferred embodiment is for client device 202 to utilize any channel idle time when the user is using client device 202 to download any updates to the data that was downloaded previously.

Figure 4:
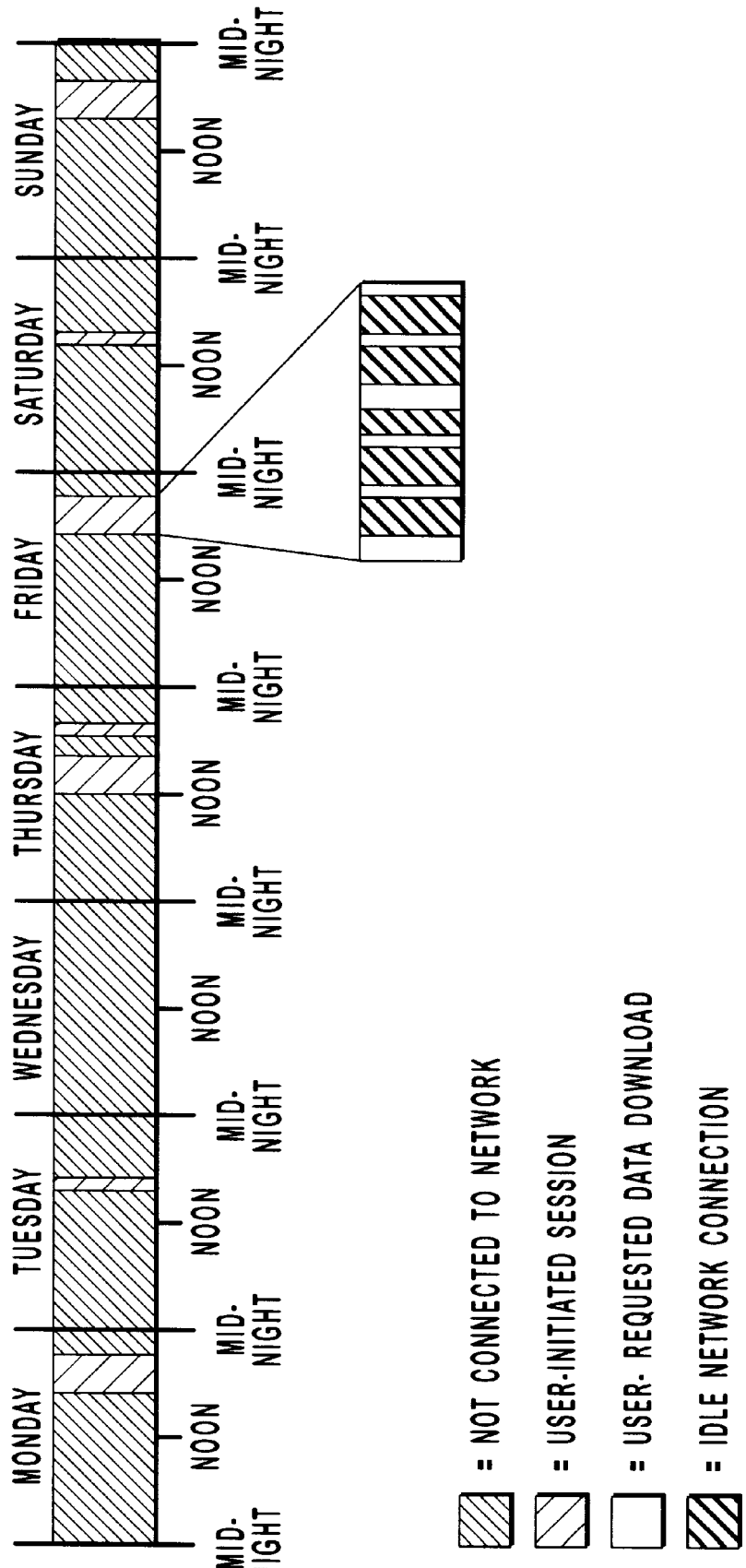
FIG. 4 illustrates prior art utilization of idle time and off-peak time on a network
Figure 5:
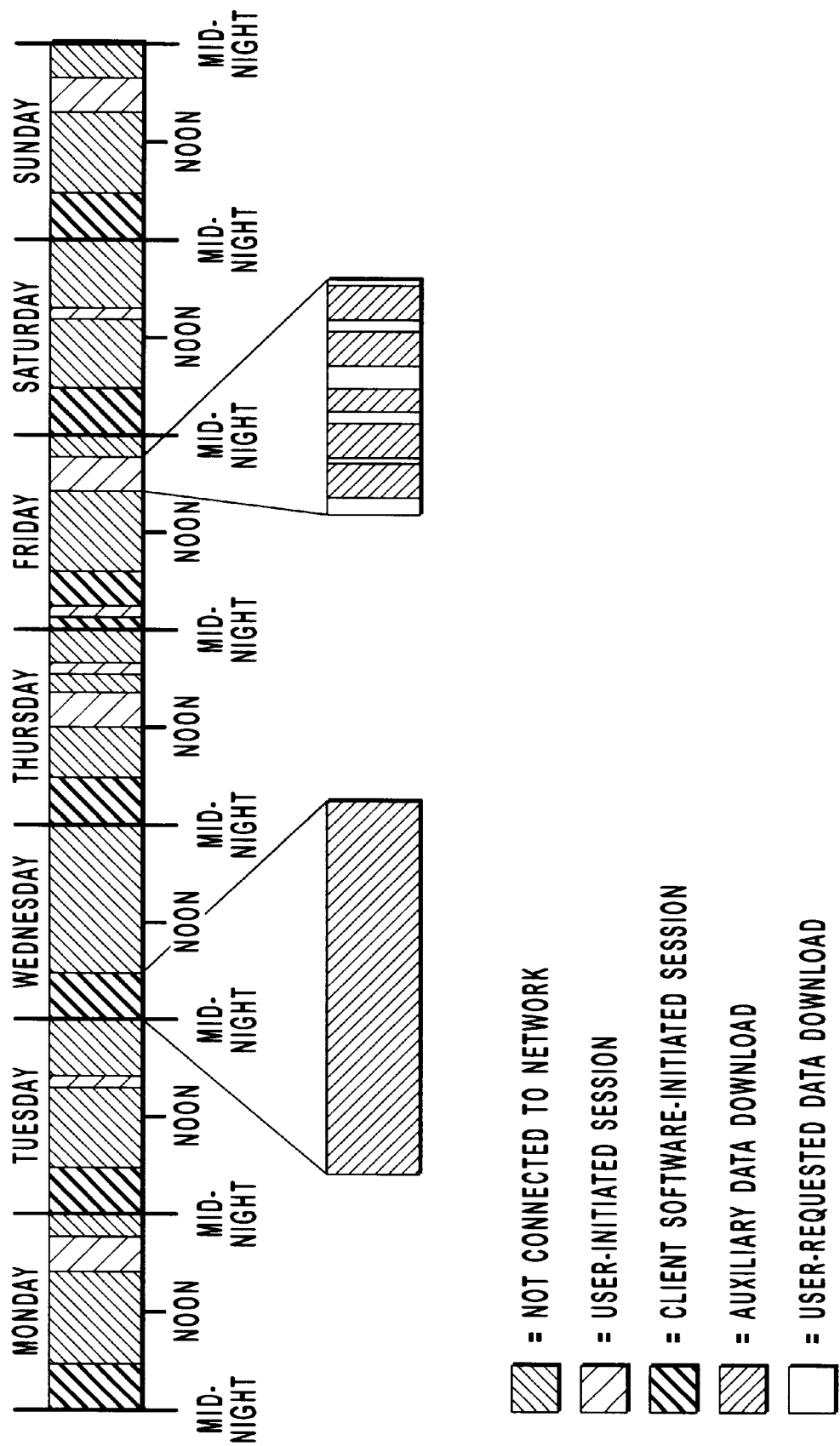
FIG. 5 illustrates improved utilization of idle time and off-peak time on a network according to one embodiment of the present invention

Thus, a clear distinction can be drawn between prior art utilization of idle time and off-peak time on a network, as illustrated in FIG. 4, and improved utilization of idle time and off-peak time on a network, as illustrated in FIG. 5. In FIG. 4, no data is transmitted when the user is connected, but idle, nor is any data transmitted during off-peak time of the day. As can be seen in FIG. 5, a great deal of data (described here as auxiliary data) is transmitted during off-peak times of the day and updated with data transmitted during idle time.

Thus, a method and apparatus for transmitting high bandwidth network content on a low bandwidth communications channel during off peak hours is disclosed. The specific arrangements and methods described herein are merely illustrative of the principles of the present invention. Numerous modifications in form and detail may be made by those of ordinary skill in the art without departing from the scope of the present invention. Although this invention has been shown in relation to a particular preferred embodiment, it should not be considered so limited. Rather, the present invention is limited only by the scope of the appended claims.

What is claimed is:

1. In a computer network that includes (i) a plurality of remote servers for accessing a plurality of network sites containing various types of content that can be viewed and downloaded, (ii) a plurality of proxy servers for caching content from frequently accessed sites of one or more of the remote servers, and (iii) a plurality of client systems each having a caching store to which requested content of one or more sites on the network can be downloaded from any of the remote or proxy servers, and wherein each of the remote servers, proxy servers and client systems are logically connected to one another over a plurality of communications channels, at least some of which are low bandwidth communication channels, a method of improving transmission of network content by utilizing off peak as opposed to peak time periods for downloading selected content, comprising the steps of:

tracking at the client system on-line usage of a user in the form of information that corresponds to one or more sites and/or the content contained at such sites accessed by the user;

during an off peak time period, the client system automatically and without user intervention, connecting to at least one of said remote or proxy servers, and authenticating to the connected server the client system that is connecting;

thereafter, during the off peak time period, downloading from the connected server content from one or more sites on the network as identified from the information tracked at the client system; and storing the downloaded content in the caching store of the client system, and then disconnecting the client system prior to return of the peak time period.

2. The method according to claim 1 wherein said step of downloading said context from one or more sites during off-peak hours includes the step of downloading advertising data.

3. The method according to claim 2 wherein said step of downloading said advertising data includes the step of storing said downloaded advertising data separately from other downloaded content.

4. The method according to claim 2 wherein said step of downloading said advertising data includes the step of allowing users to prevent downloading advertising data.

5. The method according to claim 1 wherein at least one of said communications channels is a telephone network.

6. The method according to claim 1 wherein at least one of said communications channels is an Integrated Services Digital Network (JSDN) network.

7. A method according to claim 1:

wherein said step of connecting to said at least one remote or proxy servers includes the acts of receiving on said at least one server download requests from a plurality of client systems on said network, and storing said download requests on said server for user during a coordinated multicast; and wherein said step of downloading content includes the act of broadcasting said coordinated multicast from said server to said plurality of clients at a predetermined time.

8. The method according to claim 7 further including the steps of:

said plurality of client systems assessing individual user profiles and previously downloaded data; and generating said requests based on the assessed individual user profiles and previously downloaded data.

9. The method according to claim 7 wherein said act of broadcasting said coordinated multicast from said server to said plurality of client systems at said predetermined time includes the act of broadcasting streams of data from said server to said plurality of clients.

10. The method according to claim 9 wherein said act of broadcasting streams of data from said server to said plurality of client systems includes the act of rebroadcasting streams of data from said server to said plurality of client systems at predetermined times after said broadcast.

11. In a computer network that includes (i) a plurality of remote servers for accessing a plurality of network sites containing various types of content that can be viewed and downloaded, (ii) a plurality of proxy servers for caching content from frequently accessed sites of one or more of the remote servers, and (iii) a plurality of client systems each having a caching store to which requested content of one or more sites on the network can be downloaded from any of the remote or proxy servers, and wherein each of the remote servers, proxy servers and client systems are logically connected to one another over a plurality of communications channels, at least some of which are low bandwidth communication channels, as an article of manufacture, computer program product for utilization on a client system in order to implement a method of improving transmission of network content by utilizing off peak as opposed to peak time periods for downloading selected content, said computer program product comprising:

computer readable medium for containing computer program code means; and wherein the computer program code means comprise instructions for operating a client system in accordance with a method which is comprised of the steps of:

tracking at the client system on-line usage of a user in the form of information that corresponds to one or more sites and/or the content contained at such sites accessed by the user;

during an off peak time period, the client system automatically and without user intervention, connecting to at least one of said remote or proxy servers, and authenticating to the connected server the client system that is connecting;

thereafter, during the off peak time period, downloading from the connected server content from one or more sites on the network as identified from the information tracked at the client system; and storing the downloaded content in the caching store of the client system, and then disconnecting the client system prior to return of the peak time period.

12. The method as implemented by the computer program product according to claim 11 wherein said step of downloading context from said one or more sites during off-peak hours includes the step of downloading advertising data.

13. The method as implemented by the computer program product according to claim 12 wherein said step of downloading said advertising data includes the step of storing said downloaded advertising data separately from other downloaded content.

14. The method as implemented by the computer program product according to claim 12 wherein said step of downloading said advertising data includes the step of allowing users to prevent downloading advertising data.

15. The method as implemented by the computer program product according to claim 11 wherein at least one of said communications channels is a telephone network.

16. The method as implemented by the computer program product according to claim 11 wherein at least one of said communications channels is an Integrated Services Digital Network (JSDN) network.

17. A method as implemented by the computer program product according to claim 11:

wherein said step of connecting to said at least one remote or proxy servers includes the acts of receiving on said at least one server download requests from a plurality of client systems on said network, and storing said download requests on said server for use during a coordinated multicast; and wherein said step of downloading content includes the act of broadcasting said coordinated multicast from said server to said plurality of clients at a predetermined time.

18. The method as implemented by the computer program product according to claim 17 further including the steps of:

said plurality of client systems assessing individual user profiles and previously downloaded data; and generating said requests based on the assessed individual user profiles and previously downloaded data.

19. The method as implemented by the computer program product according to claim 17 wherein said act of broadcasting said coordinated multicast from said server to said plurality of client systems at said predetermined time includes the act of broadcasting streams of data front said server to said plurality of clients.

20. The method as implemented by the computer program product according to claim 19 wherein said act of broadcasting streams of data from said server to said plurality of client systems includes the act of rebroadcasting streams of data from said server to said plurality of client systems at predetermined times after said broadcast.

* * * * *

UNITED STATES PATENT AND TRADEMARK OFFICE
CERTIFICATE OF CORRECTION

PATENT NO. : 5,978,381                                        Page 1 of 2

DATED : November 2, 1999

INVENTOR(S) : Stephen G. Perlman, William H. Yundt, Stuart Schneck

It is certified that error appears in the above-identified patent and that said Letters Patent are hereby corrected as shown below:

Col. 2, ln. 55: after "as well" insert --as--

Col 4, ln. 58: after "channels such" change "a" to --as--

Col 5, ln. 54: after "such" change "a" to --as--

Col. 9, ln. 28: after "the fact" and before "the" insert --that--

Col. 10, ln. 62: after "begins to" delete [the]

Col. 12, ln. 12: after "user" change "were" to --was--

Col. 12, ln. 65: after "requests do" change "no" to --not--

UNITED STATES PATENT AND TRADEMARK OFFICE
CERTIFICATE OF CORRECTION

PATENT NO. : 5,978,381

DATED : November 2, 1999

INVENTOR(S) : Stephen G. Perlman, William H. Yundt, Stuart Schneck

It is certified that error appears in the above-indentified patent and that said Letters Patent is hereby corrected as shown below:

Col. 14, ln. 46: after "context from" and before "one" insert --said--

Col. 14, ln. 60: after "Network" change "(JSDN)" to --(ISDN)--

Col. 15, ln. 3: after "clients at" change "a" to --said--

Col. 16, ln. 24: after "Network" change "(JSDN)" to --(ISDN)--

Col. 16, ln. 35: after "clients at" change "a" to --said--

Col. 16, ln. 48: after "data" change "front" to --from--

Signed and Sealed this

Third Day of April, 2001

Attest:

NICHOLAS P. GODICI

*Attesting Officer*     *Acting Director of the United States Patent and Trademark Office*